United States Patent [19]

Gagnon et al.

[11] Patent Number: 5,545,898

[45] Date of Patent: Aug. 13, 1996

[54] SCINTILLATION CAMERA POSITION CALCULATION WITH UNIFORM RESOLUTION USING VARIANCE INJECTION

[75] Inventors: Daniel Gagnon, Blainville; Nicole Pouliot, St. Laurent; Michel Therrien, LaSalle; Luc Laperrière, Montreal, all of Canada

[73] Assignee: Park Medical Systems, Inc., Lachine, Canada

[21] Appl. No.: 354,596

[22] Filed: Dec. 13, 1994

[51] Int. Cl.$^6$ .......................... G01T 1/161; G01T 1/208
[52] U.S. Cl. ........................ 250/369; 250/363.07
[58] Field of Search .................. 250/363.07, 363.09, 250/369

[56] References Cited

U.S. PATENT DOCUMENTS

| | | | |
|---|---|---|---|
| 4,058,728 | 11/1977 | Nickles | 250/363.07 X |
| 4,151,416 | 4/1979 | Richey et al. | 250/363.07 |
| 4,566,074 | 1/1986 | Nishikawa | 250/369 X |
| 4,599,690 | 7/1986 | Stoub | 250/363.07 X |
| 4,899,054 | 2/1990 | Barfod. | |
| 5,296,709 | 3/1994 | Jarkewicz | 250/363.07 |

FOREIGN PATENT DOCUMENTS 1280224  2/1991  Canada.

*Primary Examiner*—Carolyn E. Fields
*Assistant Examiner*—Edward J. Glick
*Attorney, Agent, or Firm*—Wolf, Greenfield & Sacks, P.C.

[57] ABSTRACT

The position calculation system has position and energy calculators for each scintillation event. After correcting the position and energy values using tables, non-uniform random distribution variance values are added to the position and energy values with the variance added being a product of the random number and a constant precalibrated for the given position. The variance injected position and energy values have a more uniform resolution and substantially remove artifact characteristics in the scintillation camera's image.

7 Claims, 1 Drawing Sheet

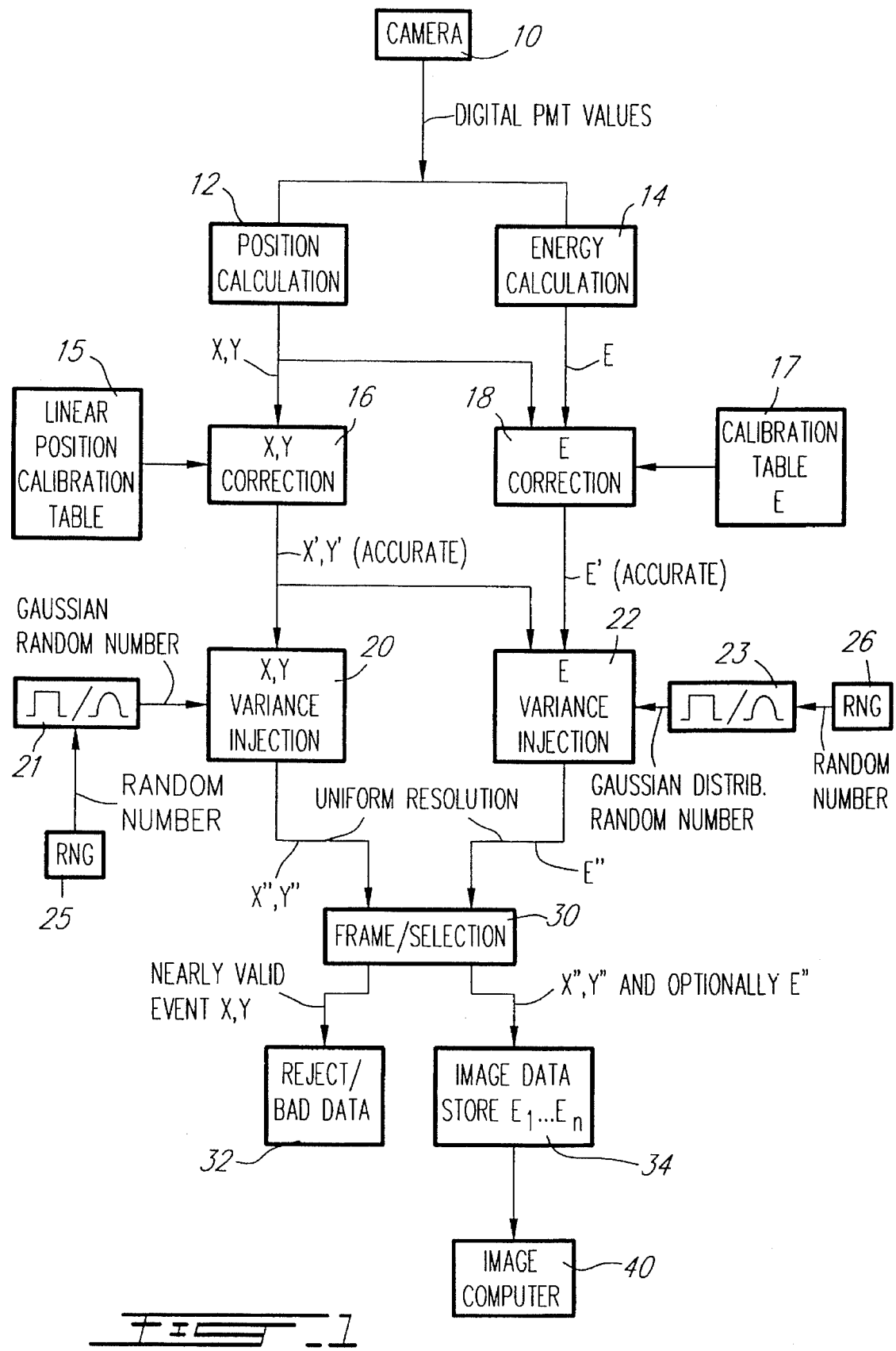

SCINTILLATION CAMERA POSITION CALCULATION WITH UNIFORM RESOLUTION USING VARIANCE INJECTION

FIELD OF THE INVENTION

The present invention relates to a scintillation position calculation apparatus. More particularly, the invention relates to such an apparatus in which artifact characteristics are reduced by adding or injecting variance to position and energy values.

BACKGROUND OF THE INVENTION

Energy and position correction or adjustment in a scintillation position calculation apparatus is described in commonly assigned U.S. Pat. No. 5,410,153 to Feirrera. In such systems, second order corrections in position and energy values for scintillation events are added as a function of originally calculated position values.

In a scintillation camera, groups of photodetectors receive light from a slab-like scintillator crystal and the intensity signals from the photodetectors are used to calculate the exact position of the scintillation event. An image formed from a very large number of scintillations is used for medical diagnostics, as is known in the art.

For each scintillation event, the raw intensity values are analyzed to determine whether the scintillation represents a direct (unscattered) gamma photon resulting from radioactive nuclear decay of an isotope ingested in trace quantities by the patient.

Since the light sensitivity of the photodetectors is not perfectly uniform over the entire entry windows of the photodetectors, errors (variance) position calculation result as a function of the scintillation's position with respect to the photodetectors. In one conventional scintillation camera, the photodetectors are arranged in a hexagonal close packed array with substantially hexagonal entry windows. The resulting image shows a noticeable trace of the "honeycomb" pattern as an artifact characteristic.

SUMMARY OF THE INVENTION

It is an object according to the present invention to provide a scintillation position calculation apparatus for calculating positions of scintillation events in a scintillation camera for generating scintillation camera images with reduced artifact characteristics. More specifically, it is an object of the present invention to add a variance—without affecting the mean—to initially calculated position values in which the variance has a non-uniform random distribution. For example, the non-uniform random distribution may be a random number following a Gaussian distribution.

According to the invention, there is provided a scintillation position calculation apparatus for calculating positions of scintillation events in a scintillation camera having a scintillator and a plurality of photodetectors optically coupled to a planar surface of the scintillator, the apparatus comprising: means for obtaining an accurate position value representing a position on the surface from scintillation event light intensity signals from the photodetectors; means for determining a variance value constant corresponding to the position; means for generating a non-uniform distribution random number; and means for adding as a variance to the position value a product of the constant and the number to obtain a variance injected position value. In this way, the variance value constant and the non-uniform distribution are selected to yield variance injected position values for generating scintillation camera images with reduced artifact characteristics.

According to the invention, there is also provided a scintillation position calculation apparatus for calculating positions of scintillation events in a scintillation camera having a scintillator and a plurality of photodetectors optically coupled to a planar surface of the scintillator, the apparatus comprising: means for obtaining an accurate position value representing a position on the surface of an event from scintillation event light intensity signals from the photodetectors; means for obtaining an accurate energy value representing an energy of scintillation for the event; means for determining an energy variance value constant corresponding to the position; means for generating a non-uniform distribution random number; means for adding as a variance to the energy value a product of the constant and the number to obtain a variance injected energy value; and means for sorting said position value as a function of the variance injected energy value. In this way, the energy variance value constant and the non-uniform distribution are selected to yield variance injected energy values for generating scintillation camera images based on sorted position values and having reduced artifact characteristics.

BRIEF DESCRIPTION OF THE DRAWINGS

The invention will be better understood by way of the following detailed description of a preferred embodiment with reference to the appended drawing in which FIG. 1 is a block diagram illustrating the scintillation position calculation apparatus according to the preferred embodiment.

DETAILED DESCRIPTION OF THE PREFERRED EMBODIMENT

As illustrated in FIG. 1, there are four basic steps carried out by the scintillation position calculation apparatus in the preferred embodiment. The acquired digital photomultiplier tube (photodetector) values from the digital camera 10 are processed in a first step to calculate an initial rough position X, Y (geometric center) of the intensity values (in a position calculation circuit 12) and at the same time, the total energy E of the scintillation (some of the intensity signals) is obtained in an energy calculation circuit 14.

In the second step, these initial values are corrected in order to obtain accurate position X', Y' and energy E' values. This correction is done in position and energy correction circuits 16 and 18 with the help of calibration tables 15 and 17 which include precalibrated correction vectors as set out in the above-mentioned commonly assigned U.S. Pat. No. 5,410,153 to Ferreira. In the second step, a known one-to-one correction as a function of rough position is applied to obtain the corrected position and energy values X', Y' and E'.

In the third step, variance values for position and energy are injected. The variance values do not have a one-to-one relationship since they are random values being applied. In the position variance injection circuit 20, the accurate position value is used to determine, from a table, a variance value constant obtained through precalibration in which the variance in position for the particular coordinates on the scintillator is recorded. The variance to be injected is an amount which will increase the variance in position for the given coordinate to that which is consistent with the rest of the scintillator. In some coordinates or locations, the variance value constant may be zero while in others (where there is usually very low variance) the constant is higher.

A random number generator 25 produces a random number according to a typical random number distribution in which the chances of obtaining a random number within a given range of values is uniform throughout the entire range of values generated by the random number generator. A Gaussian random number conversion circuit 21 converts the uniform distribution to a Gaussian distribution (non-uniform) each time variance is to be injected. The conversion is a simple non-uniform mapping of the random numbers. The position variance injection circuit 20 adds to the position values X' and Y' a product of the variance value constant and the Gaussian random number obtained from circuit 21 and 25.

The energy variance injection circuit 22 similarly adds as a variance to the energy value the product of the Gaussian distribution random number resulting from circuits 23 and 26 and the energy variance value constant obtained from a calibration table as a function of the accurate position and energy values. The result of this third step is to obtain uniform resolution position and energy values identified in FIG. 1 as X", Y" and E".

In the fourth step, the position and energy values X', Y' and E' for each scintillation are "framed" or selected by frame/selection circuit 30. If the energy value is not acceptable as a function of the calculated position, the nearly valid event (nonetheless invalid event) is rejected, and this data may be stored in a circuit 32. When it is determined that the energy indicates a valid event for the particular position of the event, the image data is stored in a circuit 34. In the case that framing is carried out, it is possible to store the image data sorted according to a given number of sub-ranges of energy values. The image computer 40 may produce an individual image for each energy sub-division or it may produce a composite image based on the image data for all acceptable energies.

We claim:

1. A scintillation position calculation apparatus for calculating positions of scintillation events in a scintillation camera having a scintillator and a plurality of photodetectors optically coupled to a planar surface of said scintillator, said apparatus comprising:

means for obtaining an accurate position value representing a position on said surface from scintillation event light intensity signals from said photodetectors;

means for determining a variance value constant corresponding to said position;

means for generating a non-uniform distribution random number; and means for adding as a variance to said position value a product of said constant and said number to obtain a variance injected position value, whereby said constant and said non-uniform distribution are selected to yield variance injected position values for generating scintillation camera images with reduced artifact characteristics.

2. A scintillation position calculation apparatus for calculating positions of scintillation events in a scintillation camera having a scintillator and a plurality of photodetectors optically coupled to a planar surface of said scintillator, said apparatus comprising:

means for obtaining an accurate position value representing a position on said surface of an event from scintillation event light intensity signals from said photodetectors;

means for obtaining an accurate energy value representing an energy of scintillation for said event;

means for determining an energy variance value constant corresponding to said position;

means for generating a non-uniform distribution random number;

means for adding as a variance to said energy value a product of said constant and said number to obtain a variance injected energy value; and means for sorting said position value as a function of said variance injected energy value, whereby said constant and said non-uniform distribution are selected to yield variance injected energy values for generating scintillation camera images based on sorted position values and having reduced artifact characteristics.

3. The apparatus as claimed in claim 1, wherein said non-uniform distribution random number is a Gaussian random number.

4. The apparatus as claimed in claim 2, wherein said non-uniform distribution random number is a Gaussian random number.

5. The apparatus as claimed in claim 1, wherein said means for obtaining an accurate position value include means for calculating an initial rough position value and means for correcting said rough initial value using calibration data.

6. The apparatus as claimed in claim 2, wherein said means for obtaining an accurate position value include means for calculating an initial rough position value and means for correcting said rough initial value using calibration data.

7. The apparatus as claimed in claim 2, wherein said sorting means include means for rejecting invalid position values and means for storing said position value according to said variance injected energy value in one of a plurality of energy sub-divisions.

\* \* \* \* \*